(12) United States Patent
Fukumoto

(10) Patent No.: US 7,699,386 B2
(45) Date of Patent: Apr. 20, 2010

(54) AUTOMOBILE ROOF REINFORCEMENT MEMBER

(75) Inventor: Koji Fukumoto, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 12/337,811

(22) Filed: Dec. 18, 2008

(65) Prior Publication Data
US 2009/0195033 A1    Aug. 6, 2009

(30) Foreign Application Priority Data
Feb. 1, 2008    (JP)    ............................ 2008-023259

(51) Int. Cl.
*B60J 7/00*    (2006.01)
(52) U.S. Cl. .................... 296/210; 296/185.1
(58) Field of Classification Search ................ 296/210, 296/185.1, 104, 118, 102
See application file for complete search history.

(56) References Cited
U.S. PATENT DOCUMENTS 5,140,913 A * 8/1992 Takeichi et al. ............. 105/397
5,681,076 A * 10/1997 Yoshii ......................... 296/210
6,926,350 B2 * 8/2005 Gabbianelli et al. .... 296/203.01

FOREIGN PATENT DOCUMENTS

| JP | 2003-112656 | 4/2003 |
|---|---|---|
| JP | 2006-240420 | 9/2006 |
| JP | 2006-240543 | 9/2006 |

* cited by examiner

*Primary Examiner*—Joseph D Pape
(74) *Attorney, Agent, or Firm*—Oblon, Spivak, McClelland, Maier & Neustadt, L.L.P.

(57) ABSTRACT

The invention provides a roof reinforcement member including an extruded aluminum alloy part which is upwardly convex and extends in a vehicle lateral direction. The extruded aluminum alloy part includes a pair of upper and lower flanges approximately parallel-facing each other as seen in a cross-section thereof and a pair of webs formed to stand along the vehicle height direction. The pair of flanges and the pair of webs form a closed sectional part. The pair of flanges each have a projecting flange portion. In the cross-section, the lower flange is thicker than the upper flange and/or the lower flange is wider than the upper flange, and the neutral axis of upward/downward bending is positioned lower than the middle of the height of the cross-section. This arrangement can reduce the stress generated on the lower side of the cross-section when the extruded aluminum alloy part is bent, so that the extruded aluminum alloy part can be effectively made stronger against deformation.

5 Claims, 6 Drawing Sheets

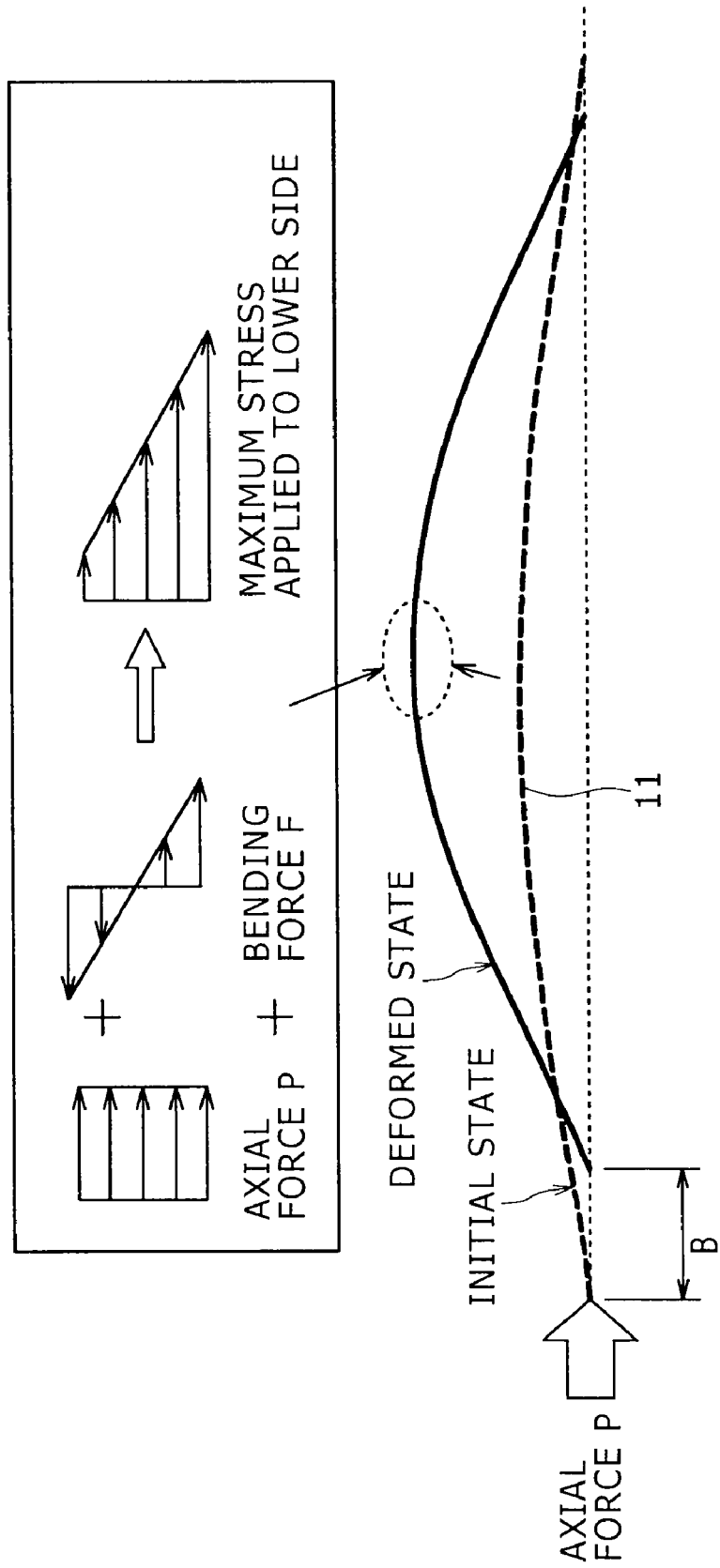

AUTOMOBILE ROOF REINFORCEMENT MEMBER

BACKGROUND OF THE INVENTION

The present invention relates to an automobile roof reinforcement member extending in the vehicle lateral direction under an automobile roof panel and, more particularly, to an automobile roof reinforcement member made of extruded aluminum alloy highly deformation resistant under an axial compressive load (applied in the longitudinal direction of the roof reinforcement member).

An automobile roof reinforcement member (hereinafter also referred to simply as a "roof reinforcement member) is installed in proximity to a roof panel member of an automobile such that it extends in the vehicle lateral direction with each end portion thereof in the vehicle lateral direction joined to a frame part, for example, a body side panel or a center pillar included in the corresponding side of the vehicle body either directly or via a bracket provided in the end portion. This is to secure rigidity and strength in the vehicle lateral direction of the roof reinforcement member and also to secure dent resistance and tensile rigidity of the roof panel member.

With the side crash standard for vehicles intensified in recent years, automobile roof reinforcement members have come to be required to have high strength against deformation caused by a compressive load applied, from a vehicle side, in the vehicle lateral direction. What is generally done to enhance the strength against axial compression of a roof reinforcement member is to form a closed sectional part in the roof reinforcement member. Aluminum alloy for extrusion is suitable for forming a shape having a closed sectional part while also being suitable to form light-weight items. Hence, various cross-sectional shapes having a closed sectional part of roof reinforcement members have been proposed (refer to, for example, Japanese Patent Laid Open Nos. 2003-112656, 2006-240420, and 2006-240543).

As stated in Japanese Patent Laid Open No. 2006-240543, the strength against axial compression of a roof reinforcement member is defined by the axial compressive load that causes the roof reinforcement member subjected to the load to start bending upward or downward. Namely, to increase the strength against deformation caused by axial compression of a roof reinforcement member, it is most effective to increase the strength against upward/downward bending of the roof reinforcement member.

As shown in FIG. 8, an extruded aluminum alloy part disclosed in Japanese Patent Laid Open No. 2006-240543 includes, as seen in a cross-section thereof perpendicular to the direction in which the aluminum alloy part was extruded, a pair of upper and lower flanges 1 and 2 approximately parallel-facing each other and a pair of webs 3 and 4 formed approximately perpendicularly to the flanges 1 and 2. The flanges 1 and 2 and webs 3 and 4 form an approximately rectangular closed sectional part 5. The flanges 1 and 2 each project, in the vehicle longitudinal direction, forward and rearward from the closed sectional part 5 thereby forming projecting flange portions 1*a*, 1*b*, 2*a*, and 2*b*, respectively. The extruded aluminum alloy part having the above described cross-sectional shape, i.e. including the flanges 1 and 2 with portions projecting from the closed sectional part 5, has higher strength against upward/downward bending than an extruded aluminum alloy part having a closed sectional part only without any projecting portion, provided that the two extruded aluminum alloy parts have an equal cross-sectional area (refer to paragraph 0025 of Japanese Patent Laid Open No. 2006-240543).

SUMMARY OF THE INVENTION

An object of the present invention is to provide a cross-sectional shape of a roof reinforcement member made of extruded aluminum alloy, the cross-sectional shape being based on the cross-sectional shape shown in FIG. 8 (including a pair of flanges 1 and 2 and a pair of webs 3 and 4 formed approximately perpendicularly to the flanges 1 and 2 with the flanges and webs forming a closed sectional part 5 and the flanges having projecting flange portions) and being capable of increasing the strength against bending of the roof reinforcement member while allowing the roof reinforcement member to be made lighter.

Suppose, as shown in FIG. 9, an upwardly convex roof reinforcement member 11 extending in the longitudinal direction of a vehicle is subjected to an axial compressive load causing the roof reinforcement member 11 to be axially pushed in (by distance B). When, as a result, the roof reinforcement member 11 is bent (changed from the broken line state into the solid line state as shown in FIG. 9), the cross-section of the roof reinforcement member 11 is subjected to a resultant force of axial force P and bending force F. This causes a maximum compressive load to be applied to the lower side of a middle portion in the vehicle lateral direction of the roof reinforcement member 11. To increase the strength against upward/downward bending of the roof reinforcement member 11, therefore, it is effective to make the cross-sectional shape of the roof reinforcement member 11 such that the stress generated on the lower side of the roof reinforcement member 11 can be kept small. The present invention has been made based on this concept.

The present invention provides a roof reinforcement member including an extruded aluminum alloy part which, under an automobile roof panel, is upwardly convex and extends in a vehicle lateral direction with both ends thereof joined to a body frame component. The extruded aluminum alloy part includes a pair of upper and lower flanges approximately parallel-facing each other as seen in a cross-section thereof, the cross-section being perpendicular to a direction in which the aluminum alloy part was extruded; and a pair of webs formed approximately perpendicularly to the pair of flanges. The pair of flanges and the pair of webs form an approximately rectangular closed sectional part. The pair of flanges each projects, in a vehicle longitudinal direction, forward and rearward from the closed sectional part. As seen in the cross-section of the aluminum alloy part, a neutral axis of upward/downward bending is positioned lower than the middle of the height of the cross-section.

Referring to the drawing of "bending force F" inside the frame in FIG. 9, the neutral axis of bending is positioned where the direction of arrows is reversed. The height of the cross-section referred to above is inclusive of the thickness of each of the upper and lower flanges.

When an axial compressive load applied to the roof reinforcement member causes the roof reinforcement member to be bent upward, the bending force applied to the lower side of the cross-section of the roof reinforcement member is smaller with the neutral axis of upward/downward bending of the roof reinforcement member positioned, as seen in the cross-section, lower than the middle of the height of the cross-section than with the neutral axis positioned in the middle of the height of the cross-section (see FIG. 8). When the bending force applied to the lower side of the cross-section of the roof reinforcement member is reduced, the stress generated in the lower side of the cross-section of the roof reinforcement member by the resultant force of the axial force and bending force is reduced, resulting in a higher strength against bending of the roof reinforcement member. This makes it possible to reduce the weight of the roof reinforcement member.

The neutral axis can be positioned lower than the middle of the height of the cross-section by making the lower flange thicker than the upper flange and/or by making the lower flange wider in the vehicle longitudinal direction than the upper flange.

An inside web may be formed, as required, in the closed sectional part such that the upper and lower edges of the inside web are joined to the upper and lower flanges, respectively, and such that the inside web is approximately perpendicular to the upper and lower flanges.

The present invention can provide a roof reinforcement member including an extruded aluminum alloy part which, under an automobile roof panel, is upwardly convex and extends in the vehicle lateral direction and which has a particular cross-sectional shape (including a pair of flanges 1 and 2 and a pair of webs 3 and 4 formed approximately perpendicularly to the flanges 1 and 2 with the flanges and webs forming a closed sectional part 5 and the flanges having projecting flange portions), the cross-sectional shape making the roof reinforcement member stronger against bending and lighter in weight than existing roof reinforcement members.

BRIEF DESCRIPTION OF THE DRAWINGS

FIG. 9 is a diagram for explaining a load applied to a vertical cross-section of a roof reinforcement member when it is bent.

DETAILED DESCRIPTION OF THE PREFERRED EMBODIMENT

FIGS. 1A, 1B, and 2A to 2C each show an example cross-section (perpendicular to the direction of extrusion) of a roof reinforcement member made of extruded aluminum alloy according to the present invention.

Figure 1A:
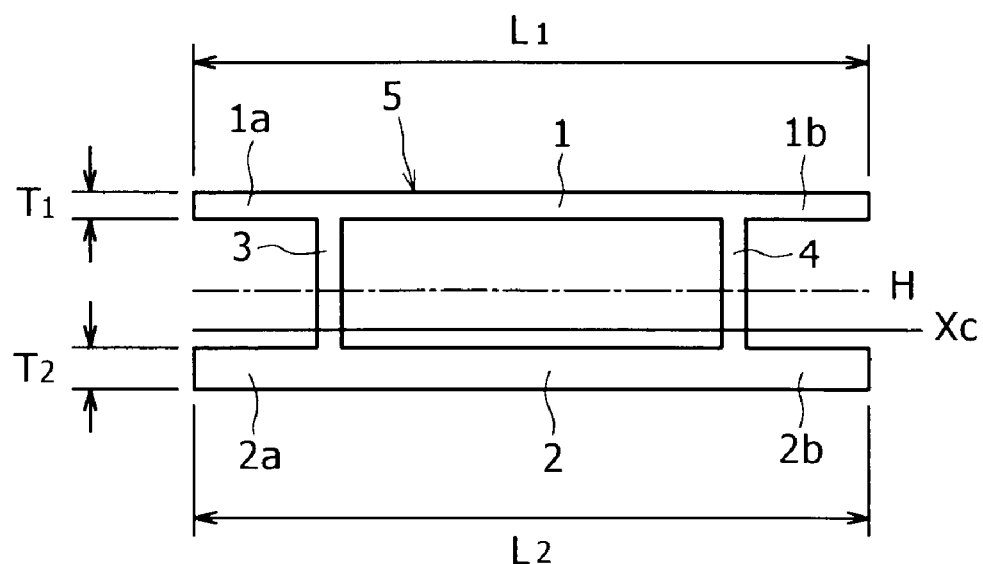
FIGS. 1A and 1B are diagrams showing example cross-sections of roof reinforcement members made of extruded aluminum alloy according to the invention.
Figure 1B:
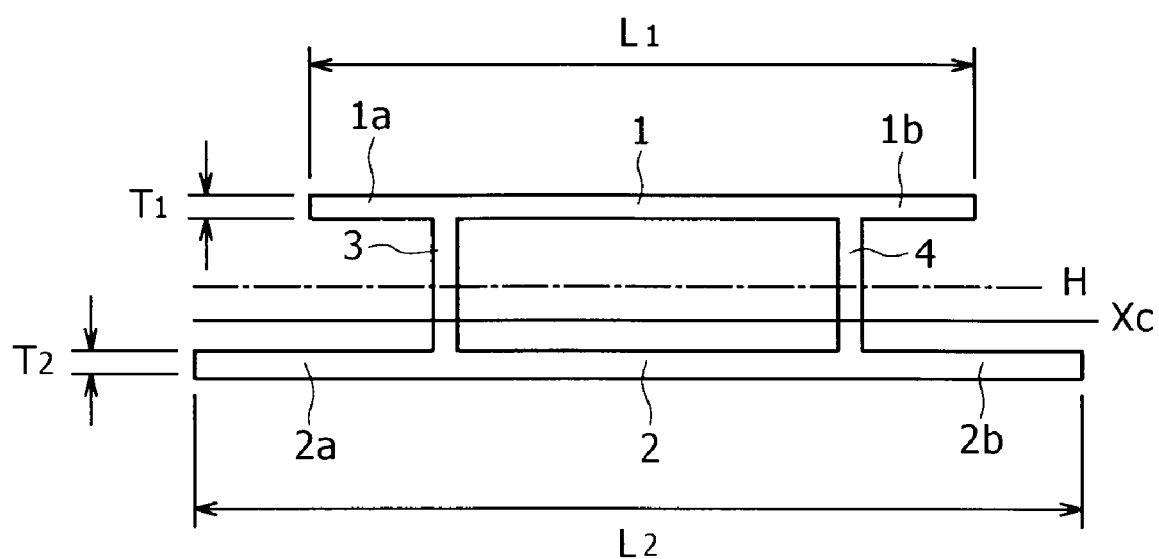

The cross-sections shown in FIGS. 1A and 1B each include a pair of upper and lower flanges 1 and 2 parallel-facing each other, and a pair of webs 3 and 4 formed perpendicularly to the flanges 1 and 2. The flanges 1 and 2 and webs 3 and 4 are plate parts each having a uniform thickness. They form an approximately rectangular closed sectional part 5. The flanges 1 and 2 each project, in the vehicle longitudinal direction, forward and rearward from the closed sectional part 5 thereby forming projecting flange portions 1a, 1b, 2a, and 2b, respectively.

Referring to the cross-section shown in FIG. 1A, the widths (in the vehicle longitudinal direction) L1 and L2 of the flanges 1 and 2 are equal, whereas the thickness T2 of the lower flange 2 is greater than the thickness T1 of the upper flange 1 (T2>T1). Referring to the cross-section shown in FIG. 1B, the thicknesses T1 and T2 of the flanges 1 and 2 are equal, whereas the width L2 of the lower flange 2 is greater than the width L1 of the upper flange 1 (L2>L1). Therefore, in each of the cross-sections shown in FIGS. 1A and 1B, a neutral axis Xc of upward/downward bending is lower than a middle-of-height line H.

The neutral axis Xc of upward/downward bending is preferably positioned lower than a 47% level, or more preferably, 45% level of the total height of the whole cross-section.

Figure 8:
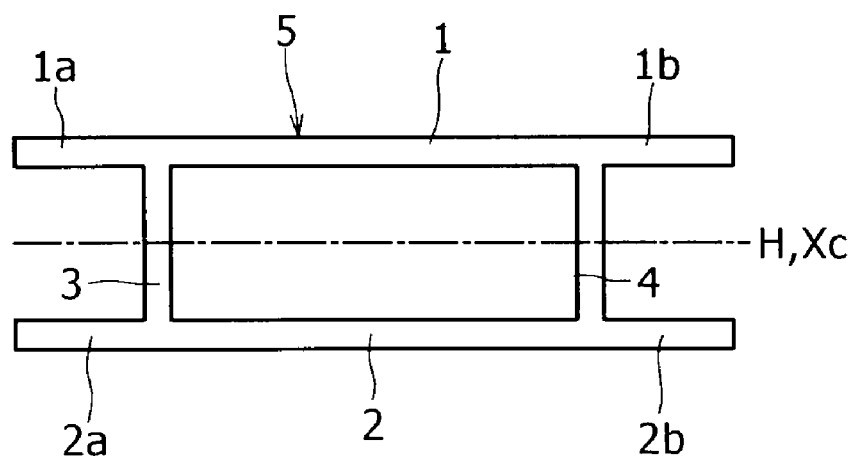
FIG. 8 is a diagram showing a cross-section of an existing roof reinforcement member.

In the cross-section of an existing roof reinforcement member shown in FIG. 8, a neutral axis Xc of bending coincides with a middle-of-height line H of the cross-section.

Figure 2A:
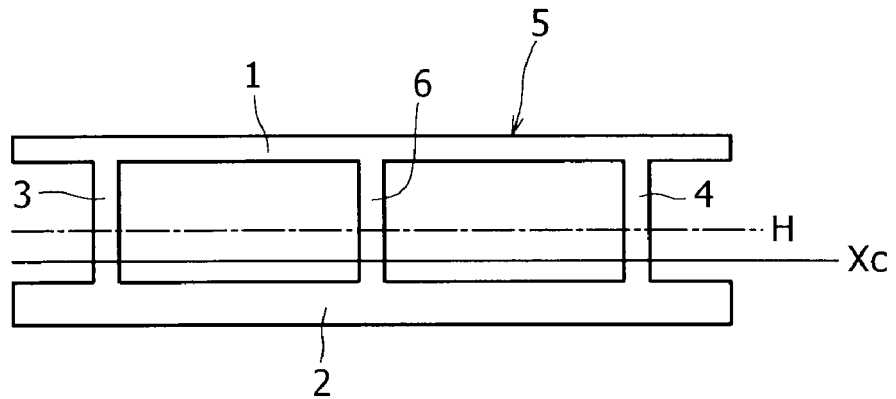
FIGS. 2A to 2C are diagrams showing other example cross-sections of roof reinforcement members made of extruded aluminum alloy according to the invention.
Figure 2B:
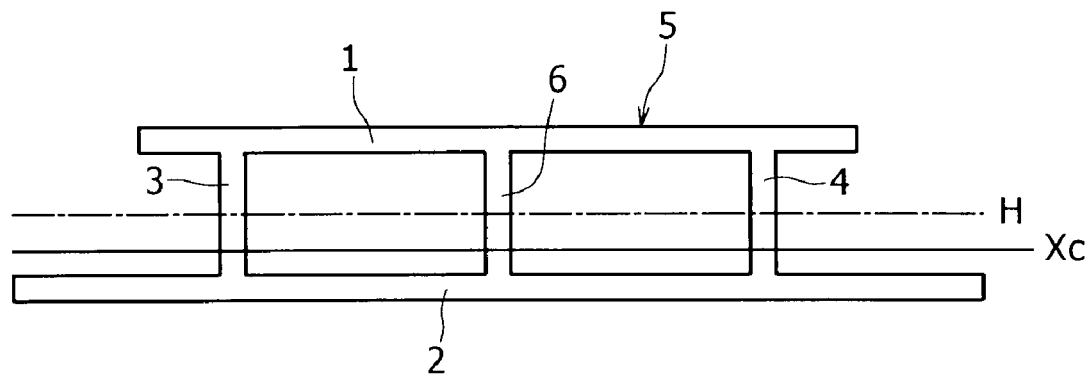
Figure 2C:
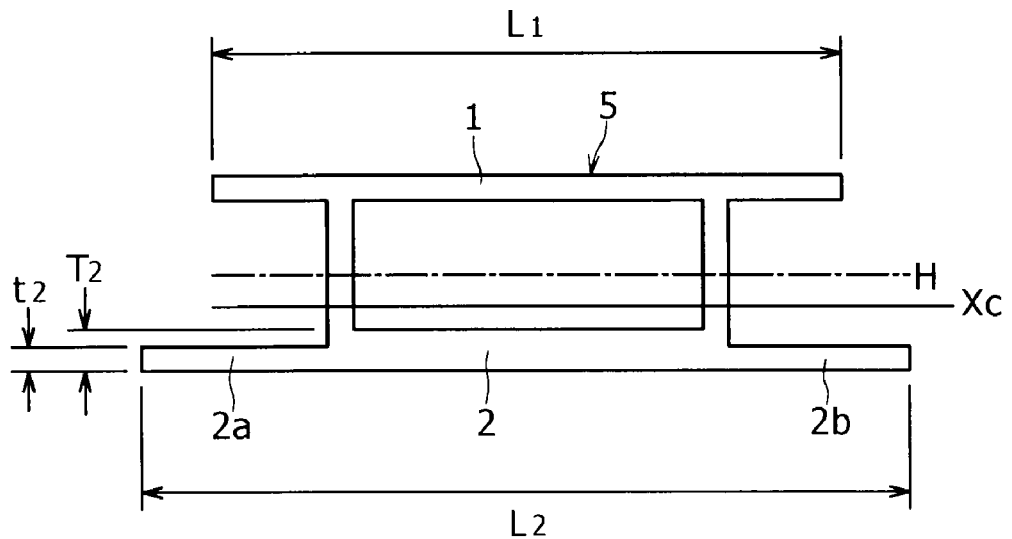

The cross-sections shown in FIGS. 2A to 2C are example modifications of the cross-sections shown in FIGS. 1A and 1B. In each of the cross-sections shown in FIGS. 2A to 2C, a neutral axis Xc of upward/downward bending is positioned lower than a middle-of-height line H. The cross-sections shown in FIGS. 2A and 2B differ from the cross-sections shown in FIGS. 1A and 1B in that they each have an inside web 6 formed inside a closed sectional part 5 to be parallel with webs 3 and 4. The inside web 6 is also a plate part having a uniform thickness. It is formed as required to prevent flanges 1 and 2 from bending in cases where the closed sectional part 5 has a relatively large width in the vehicle longitudinal direction.

The cross-section shown in FIG. 2C differs from the cross-section shown in FIG. 1A in that projecting flange portions 2a and 2b of a lower flange 2 have a thickness t2 which is smaller than the thickness T2 of the other portion of the lower flange 2 (T2>t2) and in that the lower flange 2 has a width L2 which is larger than the width L1 of an upper flange 1 (L2>L1). Reducing the thickness of the projecting flange portions 2a and 2b of the lower flange 2 and increasing the width of the lower flange 2 is effective in obtaining higher bending strength with lighter weight as stated in paragraph 0010 of Japanese Patent Laid-Open No. 2006-240543.

[Analysis 1]

Figure 3:
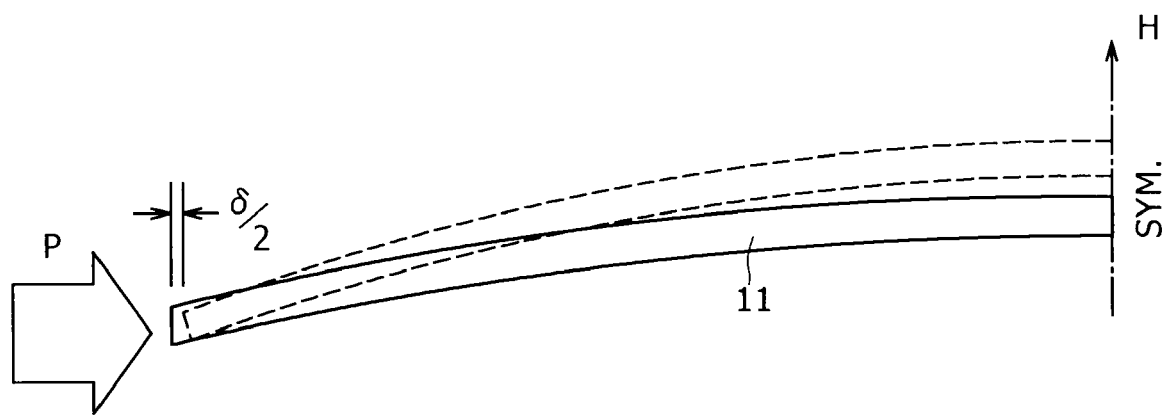
FIG. 3 is a schematic diagram (showing a left half only of a roof reinforcement member) for explaining conditions based on which FEM analysis was performed.
Figure 4:
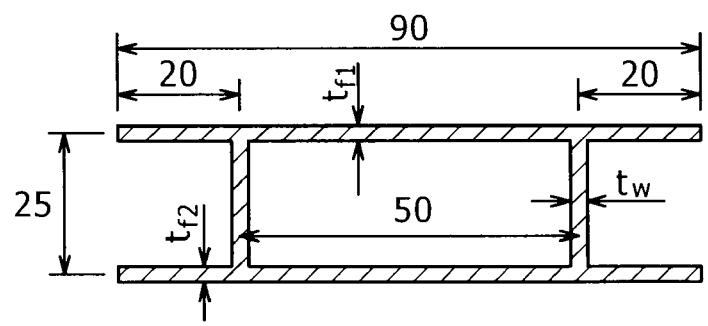
FIG. 4 is a diagram showing a cross-sectional shape of test pieces used for FEM analysis.

To study the effects of the invention, axial compressive load vs. displacement curves at axial breakage were analyzed by FEM analysis. The analysis was carried out based on the assumption that, as shown in FIG. 3, an axial compressive load P was applied, as a side impact load, to an end portion of each test piece (roof reinforcement member 11) to bend the test piece, and the relationship between the axial compressive load P and compressive displacement δ was analyzed. The test pieces were each assumed to be a 1000 mm long, upwardly convex (with a curvature radius of 12000 mm) one made of extruded 7000-series aluminum alloy with a compressive strength of 310 MPa, a tensile strength of 365 MPa, and an elongation of 14%. Each of the test pieces was also assumed to have a cross-section as shown in FIG. 4. Flange thicknesses tf1 and tf2 and a web thickness tw were used as parameters. The FEM analysis was carried out using the finite element analysis code ABAQUS.

Table 1 lists the values of thicknesses tf1, tf2 and tw and the weights of three test pieces referred to as CASE 1 to CASE 3. CASE 1 represents an existing type of a roof reinforcement member in which upper and lower flanges have a same thickness and the neutral axis of bending is positioned in the middle of the height of the cross-section. CASES 2 and 3 represent roof reinforcement members according to the present invention in which the lower flange is thicker than the upper flange and the neutral axis of bending is positioned lower than the middle of the height of the cross-section.

TABLE 1

|  | Web thickness tw (mm) | Upper flange thickness tf1 (mm) | Lower flange thickness tf2 (mm) | Distance between lower flange bottom and neutral axis (neutral axis height) (mm) | Test piece weight (kg) | Maximum load (kN) |
| --- | --- | --- | --- | --- | --- | --- |
| CASE 1 | 2.30 | 2.30 | 2.30 | 12.5 | 1.42 | 29.79 |
| CASE 2 | 1.80 | 1.80 | 2.60 | 10.9 | 1.36 | 31.04 |
| CASE 3 | 2.00 | 1.80 | 2.40 | 11.3 | 1.34 | 29.82 |

Figure 5:
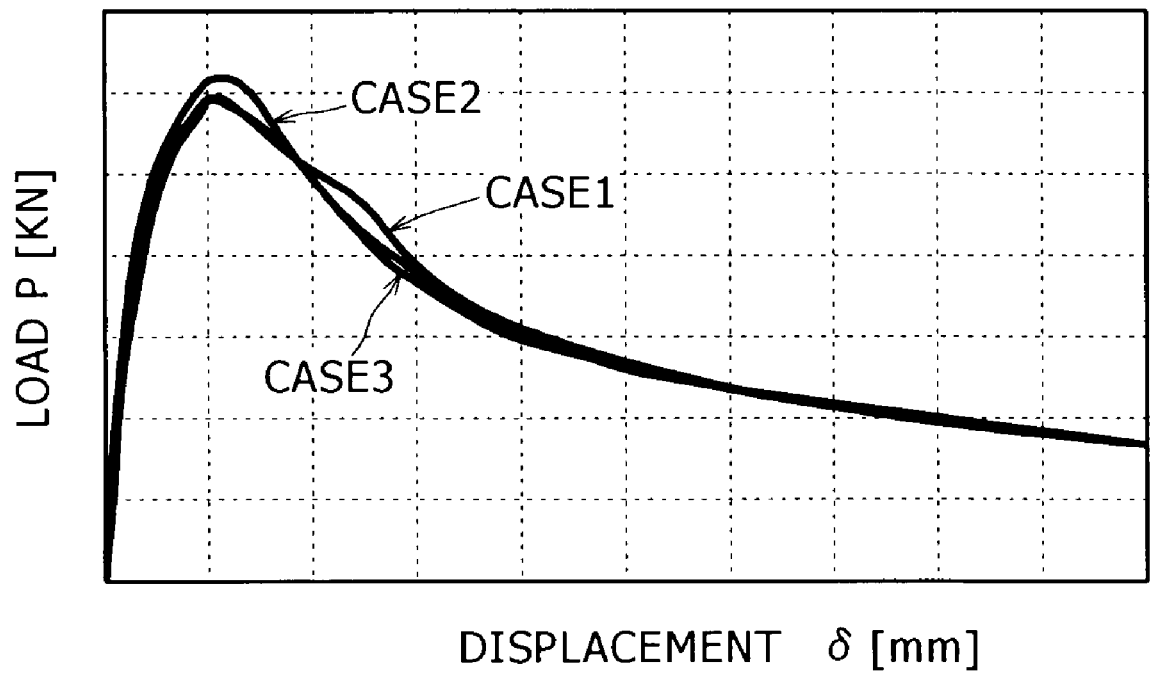
FIG. 5 is a graph showing load P vs. displacement δ curves obtained by FEM analysis.

FIG. 5 shows the relationships between compressive load P and compressive displacement δ determined by the analysis performed on three test pieces CASE 1 to CASE 3 listed in Table 1. The strengths against deformation (maximum compressive loads) of the test pieces determined from the relationships between axial compressive load P and compressive displacement δ, shown in FIG. 5, are listed in Table 1.

As Table 1 shows, even though CASES 2 and 3 representing roof reinforcement members according to the present invention are lighter than CASE 1 representing an existing roof reinforcement member, their strengths against deformation are at least comparable to that of CASE 1.

[Analysis 2]

Figure 6:
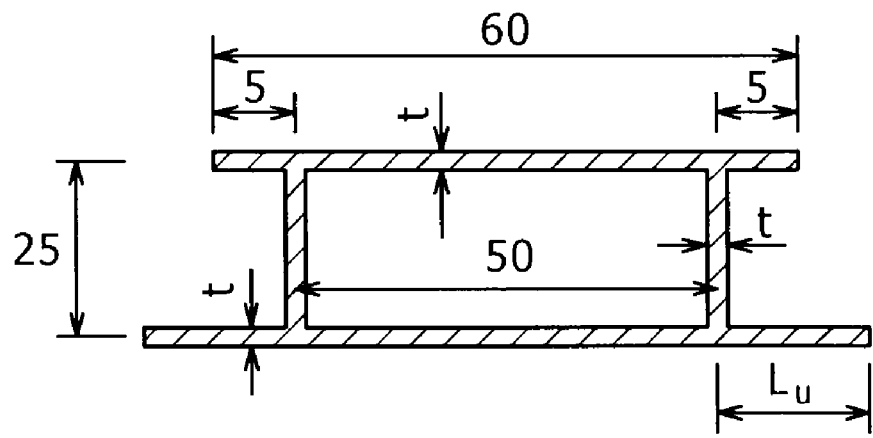
FIG. 6 is a diagram showing another cross-sectional shape of test pieces used for FEM analysis.

FEM analysis was also carried out, to analyze axial compressive load vs. displacement curves at axial breakage, under the same conditions as Analysis 1 described above except that test pieces were assumed to have a cross-section as shown in FIG. 6 and that the width Lu of each of the projecting lower flange portions and the thickness t of the lower flange were used as parameters.

Table 2 lists the values of width Lu and thickness t, and the weights of four test pieces referred to as CASE 4 to CASE 7. CASE 4 represents an existing type of a roof reinforcement member in which upper and lower flanges have a same width and the neutral axis of bending is positioned in the middle of the height of the cross-section. CASES 5 to 7 represent roof reinforcement members according to the present invention in which the lower flange is wider than the upper flange and the neutral axis of bending is positioned lower than the middle of the height of the cross-section. In all of CASES 4 to 7, the upper and lower flanges and web were assumed to have a same thickness.

As Table 2 shows, even though CASES 5 to 7 representing roof reinforcement members according to the present invention are lighter than CASE 4 representing an existing roof reinforcement member, their strengths against deformation are at least comparable to that of CASE 4.

The present invention is aimed at providing a light, high-strength roof reinforcement member, so that the weight of the roof reinforcement member is an important factor. For Analyses 1 and 2 described above, therefore, the test pieces were assumed to have approximately identical weights (or the test pieces representing roof reinforcement members according to the present invention were assumed to be slightly lighter than the test pieces representing existing roof reinforcement members).

What is claimed is:

1. A roof reinforcement member including an extruded aluminum alloy part which, under an automobile roof panel, is upwardly convex along the extruded length of the aluminum alloy part, wherein the extruded length of the aluminum alloy part extends in a vehicle lateral direction with both longitudinal ends thereof joined to a body frame component, the extruded aluminum alloy part comprising:

a pair of upper and lower flanges approximately parallel-facing each other as seen in a cross-section of the aluminum alloy part, the cross section extending transverse to the extruded length of the aluminum alloy part; and a pair of webs formed approximately perpendicularly to the pair of flanges;

wherein the pair of flanges and the pair of webs form an approximately rectangular closed sectional part, the pair

TABLE 2

|  | Test piece thickness t (mm) | Width of projecting lower flange portion Lu (mm) | Distance between lower flange bottom and neutral axis (neutral axis height) (mm) | Test piece weight (kg) | Maximum load (kN) |
| --- | --- | --- | --- | --- | --- |
| CASE 4 | 2.3 | 5 | 12.5 | 1.10 | 21.8 |
| CASE 5 | 2.1 | 10 | 11.8 | 1.06 | 21.9 |
| CASE 6 | 2.0 | 15 | 11.2 | 1.07 | 22.8 |
| CASE 7 | 1.9 | 20 | 10.7 | 1.07 | 23.1 |

Figure 7:
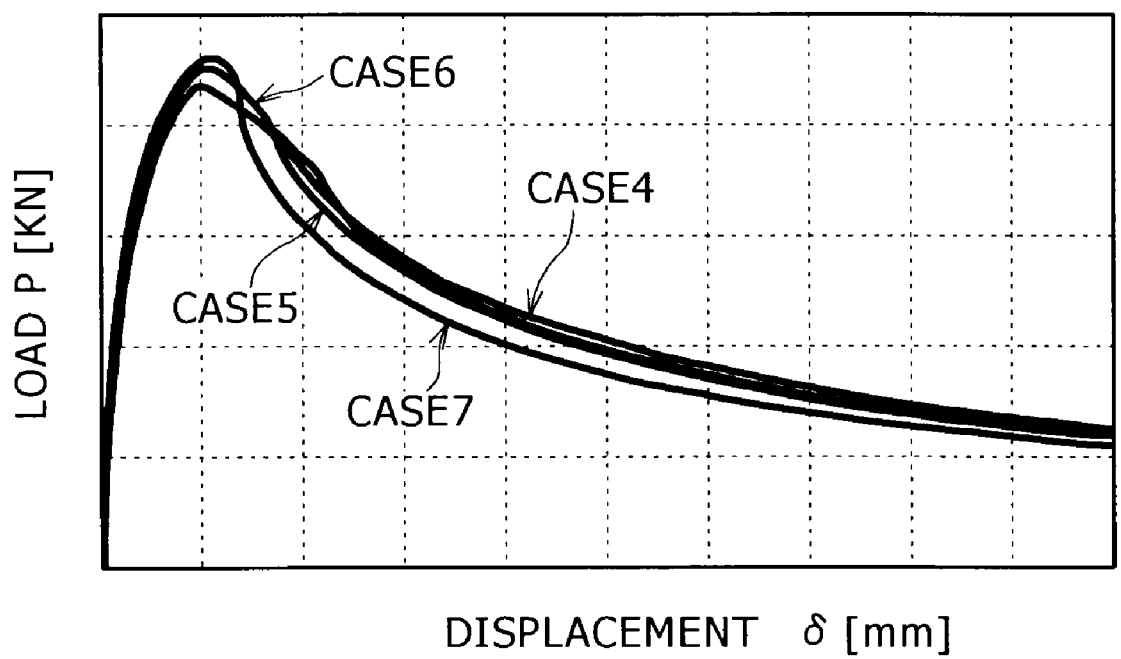
FIG. 7 is a graph showing load P vs. displacement δ curves obtained by FEM analysis.

FIG. 7 shows the relationships between compressive load P and compressive displacement δ determined by the analysis performed on four test pieces CASE 4 to CASE 7 listed in Table 2. The strengths against deformation (maximum compressive loads) of the test pieces determined from the relationships between axial compressive load P and compressive displacement δ, shown in FIG. 7, are listed in Table 2.

of flanges each projecting, in a vehicle longitudinal direction, forward and rearward from the closed sectional part; and wherein the roof reinforcement member is constructed such that, as seen in the cross-section of the aluminum alloy part, the shape of the cross section is such that a neutral axis of vertical bending of the aluminum alloy part is positioned lower than the middle of the vertical height of the cross-section of the aluminum alloy part.

2. The roof reinforcement member according to claim 1, wherein, at least in the closed sectional part, the lower flange is thicker than the upper flange.

3. The roof reinforcement member according to claim 2, wherein, over an entire width thereof in the vehicle longitudinal direction, the lower flange is thicker than the upper flange.

4. The roof reinforcement member according to claim 1, wherein the lower flange is wider than the upper flange in the vehicle longitudinal direction.

5. The roof reinforcement member according to claim 1, wherein the closed sectional part includes an inside web formed approximately perpendicularly to the upper and lower flanges, upper and lower end portions of the inside web being joined to the upper and lower flanges, respectively.

* * * * *